United States Patent [11] 3,627,704

[72] Inventors Raymond Michael Moran, Jr.
 Brick Town;
 Robert Paul Kretow, Lakewood, both of N.J.
[21] Appl. No. 868,924
[22] Filed Oct. 23, 1969
[45] Patented Dec. 14, 1971
[73] Assignee Ciba Corporation
 Summit, N.J.

[54] CURABLE COMPOSITIONS OF EPOXY RESINS AND 4,6-BIS(SUBSTITUTED CARBAMYL)ISOPHTHALIC ACID
 3 Claims, No Drawings
[52] U.S. Cl. ..................................... 260/2 N,
 117/161 ZB, 260/47 CN, 260/18 EP, 260/37 EP, 260/78.4 EP, 260/79, 260/88.3 A, 260/91.3 R
[51] Int. Cl. ........................................ C08q 30/14
[50] Field of Search ........................................... 260/47 EP, 47 CA, 47 CN, 2 EP, 2 CA, 2 CN, 59, 18 EP, 18 TN

[56] References Cited
 UNITED STATES PATENTS
 3,140,299 7/1964 Loncrini ...................... 260/47 Ep X
 OTHER REFERENCES
 E. I. du Pont de Nemours & Co. Bulletin PMDA/P-MA6/1960 (page 5)
 Chemical Abstracts, Vol. 64 (12807D) 1966

*Primary Examiner*—William H. Short
*Assistant Examiner*—T. Pertilla
*Attorneys*—Harry Goldsmith, Joseph G. Kolodny and Mario A. Monaco

ABSTRACT: 4,6-Bis (substituted carbamyl) isophthalic acid compounds are used as latent hardeners for epoxy resins materials the cured resins therefrom are employed in high-temperature adhesives and coating applications. The hardener effect is achieved by curing at elevated temperatures.

CURABLE COMPOSITIONS OF EPOXY RESINS AND 4,6-BIS(SUBSTITUTED CARBAMYL)ISOPHTHALIC ACID

BACKGROUND OF THE INVENTION

This invention relates to the curing of epoxy resins. More particularly, it relates to the discovery of a class of compounds useful in the curing of epoxides to produce materials useful as high-temperature adhesives, castings, moldings and powder coatings.

There are a great many forms of epoxide resins available today, many of which can be cured by various means to provide final products tailored to a specific end use. Thus, solid, infusible resins have been prepared in this manner using a variety of amines as curing agents. Similarly, soft, flexible products have been obtained using certain metal salt as a curing agent for some polyepoxides.

Epoxy systems normally are comprised of at least two compounds, one of which is the epoxy resin, and the other a hardener. Prior to use, these components must be stored separately, to prevent reaction to a cured or infusible state. In the production of cured epoxides, it is sometimes desirable to provide a mixture which will not cure under normal ambient conditions, but will remain as a stable blend for a reasonable period of time. Activation of such a mixture to a cured state, desirably, is then achieved by curing at an elevated temperature. The mixture should have a cure time at an elevated temperature that will not be oppressive from an economic point of view, but should not be so rapid as to prevent adequate working time. In addition to these characteristics, the resulting cured product should possess good physical and mechanical qualities so as to function in an acceptable manner. The art has not been altogether successful in achieving these results for various reasons. Thus, while a stable resin/hardener mixture may be obtained, the resulting blend is not always curable under reasonable conditions of time and temperature. Often, if curable, the blend is not cured to an entirely suitable state. Therefore, the art is continuously searching for new and improved hardener materials.

A new class of compounds has now been discovered which when blended with various epoxides results in a relatively stable mixture under normal conditions, but which because of latent hardening capabilities, exerts a curing effect on the epoxides at elevated temperatures. Such compounds may be described as 4,6-bis (substituted carbamyl) isophthalic acids having the formula

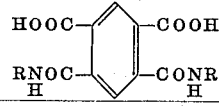

wherein R is an amino-bearing phenyl, benzyl, cyclohexyl, or cyclohexylmethyl radical. More particularly, R is either

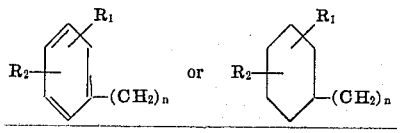

wherein $n$ is 0 or 1 and $R_1$ and $R_2$ are hydrogen, alkyl, amino, alkyl-amino, alkoxy, and heterocyclic system containing a heteronitrogen atom carrying an active hydrogen; provided however that $R_1$ and $R_2$ are not at the same time hydrogen and provided that at least one of said $R_1$ and $R_2$ substituents is amino or amino-bearing. Preferred groups are amino, methyl, ethyl, aminomethyl, aminoethyl, aminopropyl, benzimidazolyl, methoxy, ethoxy, propoxy, and pyridyl, and the like. The most preferred compound is not wherein R is 2-aminophenyl. Other illustrative compounds are:

4,6 bis [(3-aminomethyl, cyclohexylmethyl)carbamyl] isophthalic acid,
4,6 bis (3-aminophenyl carbamyl) isophthalic acid,
4,6 bis [(3-aminomethyl phenyl)carbamyl] isophthalic acid,
4,6 bis [(4-methoxy-6-aminophenyl)carbamyl] isophthalic acid,
4,6 bis [(1-methyl-4[2-amino-isopropyl]cyclohexyl) carbamyl isophthalic acid, and
4,6 bis [(4-benzimidazolyl phenyl)carbamyl] isophthalic acid.

The foregoing latent hardeners demonstrate their capability when employed with a wide variety of epoxy compounds. Various conditions of cure time and temperature, and the physical properties of the cured resin will, of course, vary from compound to compound. In general, however, the epoxy compounds to be cured are those possessing more than one epoxide group and may carry inert substituents such as chloro and other well known and encountered in the art, and may be monomers or polymeric. They also contain ether linkages and ester groups as well. Especially preferred are epoxides prepared from Bisphenol A, a phenol or cresol and epichlorhydrin, although virtually any epoxide produced from a polyhydric alcohol and epichlorhydrin may be used. Preferably, epoxides having an epoxy value of 0.40–70 equivalent per 100 gm. of material are suitable. Typical epoxides are those produced from epichlorhydrin and a polyhydric phenol or alcohols such as resorcinol, catechol, 1,2,6-hexanetriol, sorbitol, mannitol pentaerythritol, trimethylolpropane, glycerol allyl ether. Similarly, polymeric materials containing polyhydric hydroxyls such as appropriately substituted polyethers and polyesters may likewise be employed. For example, there may be employed vinyl cyclohexene dioxide, epoxidized mono-, di- and triglycerides, butadiene dioxide, 1,4-bis(2,3-epoxypropoxy)benzene, 1,3-bis(2,3-epoxypropoxy)benzene, 4,4'-bis(2,3-epoxypropoxy)diphenyl ether, 1,8-bis-(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy) 2-chlorocyclohexane, diglycidyl thioether, diglycidyl ether, ethylene glycol diglycidyl ether, resorcinol diglycidyl ether, 1,2,5,6-diepoxyhexyne-3, 1,2,5,6-diepoxyhexane, and 1,2,3,4,-tetra-(2-hydroxy-3,4-epoxybutoxy)butane.

Other examples include the glycidyl polyethers of polyhydric phenols obtained by reacting a polyhydric phenol with an excess, e.g., 4 to 8 mol excess, of a chlorohydrin, such as epichlorohydrin and diglycerol chlorohydrin. Thus, a polyether, which is substantially diglycidyl ether of 2,2-bis(2,3-epoxypropoxyphenyl)propane is obtained by reacting bisphenol 2,2-bis(4-hydroxyphenyl)propane with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)-butane, 4,4'-dihydroxybenzophenone, bis(4-hydroxyphenyl)-ethane, and 1,5-dihydronaphthalene.

Still a further group of the polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol butylene glycol, hexanetriol, sorbitol, mannitol, pentanetriol, pentaerythritol, di- and tripentaerythritol, polyglycerol, dulcitol, inositol, carbohydrates, methyltrimethylolpropane 2,6-octanediol, 1,2,4,5,-tetrahydroxycyclohexane, 2-ethyl-hexanetriol-1,2,6, glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether and sorbitol tetraglycidyl ether.

A further group of the polyepoxides comprises the polyepoxy polyesters obtained by esterifying a polycarboxylic acid with an epoxy-containing alcohol, such as, for example, the diglycidyl ester of adipic acid, the diglycidyl ester of malonic acid, and the diglycidyl ester of succinic acid.

Typically, the benefits of the invention are obtained by blending the hardener with the epoxides, usually employing standard blending equipment known in the art, together with any other adjuvants desired, and then when read for use in service, by activating the hardener. In general, the amount of hardener used will be at or near the stoichiometric amount required for the specific ingredients. Usually, this will range from about 10 to 45 parts of hardener per 100 parts of resin (phr). For the preferred compositions of the invention, this range will be about 15 to 30 and most preferably, about 20 phr.

The conditions of time and temperature used for cure ordinarily as previously stated, will vary from blend to blend. In general, however, elevated cure temperatures ranging from 130° C. to 170° C., and preferably 140° to 160° C, will produce physically desirable resin products within 30 minutes to 1 hours, and usually within 30 minutes. OF course, these cures can be effected in the same attitude as the end use where the physical conditions permit. Most preferably, the cures are effected by a preliminary gel period at a low curing temperature followed by storage for a somewhat longer period at a more elevated temperature. Best results are obtained by an initial gelling at around 90° to 100° C., followed by heating at around 130° to 170° C. for 30 minutes to 1 hour. Solid bisphenol A based resins are generally slower curing than liquid bisphenol A based resins and may require the use of chemical accelerators or less preferably, higher temperature or longer cure times. It is not, under most circumstances, ordinarily desired to raise the curing temperature to accelerate these times because in doing so there is a tendency for the reaction mixture to gel too rapidly. Therefore, it is preferred to use such chemical accelerators as isoniazid, dicyandiamide, imidazole, and the like. These are usually employed at levels from about 0.1 to 5 phr, and preferably 0.5 to 3 phr. Other adjuvants such as fillers, coloring agents and the like, typified by silica, pumice, pigments and the like, may also be used.

The products of the present invention are stable prior to cure for relatively long periods of time under normal conditions. It is not unusual for the blend to remain latent or dormant for periods of 10 months or more when stored at 25° C. However, storage times longer than 3 months at temperatures of 40°C. and higher should be avoided.

The cured products obtained from the compositions of this invention find application in a variety of areas including high-temperature adhesives, electrical potting and coating applications and the like. Their outstanding dielectric properties together with good tensile and flexural properties make these materials eminently suitable for electrical insulation applications. As such they are quite favorably compared to aromatic amine-cured epoxides.

Certain of the latent hardener compounds of the present invention are novel. As far as is known only 4,6-bis[(2-aminophenyl)carbamyl] isophthalic acid (i.e., R=2-aminophenyl in the formula above) is known, having been described in Chem. Abst. 64: 12807 D. All other components within the general class above are new. They may be prepared by following the procedure set forth in the above-noted reference making the appropriate substitution for the aminophenyl substituent-carrying reactant. For instance, in the illustrative example below, the appropriate R-containing compound corresponding to 1,2-diaminobenzene is reacted with pyromellitic acid dianhydride in a suitable inert solvent such as dimethyl formamide, diemthylacetamide, and the like. The reaction is exothermic and it is desirable to proceed at a temperature below about 40° C, preferably between 20°-35° C. The final compound is then recovered by standard techniques.

The following examples are illustrative of preferred embodiments of the invention.

EXAMPLE 1

Twenty-nine parts by weight of 4,6 bis [(2-amino-phenyl) carbamyl] isophthalic acid are blended with 100 parts of a liquid epoxy resin prepared from bisphenol A and epichlorhydrin and having an epoxy value of 0.53 equivalents per 100 gm. on a three-roll mill at about 23° C. until a smooth, pasty blend is obtained. This material can be cured at elevated temperatures in a short period of time, and has the ability to retain that characteristic for over a year. This is demonstrated by observing the amount of time required to effect gelling or hardening at the indicated cure temperature. Such a gel-time test is as follows:

A cure plate is heated to 150±0.5° C. and coated with a thin film of release agent.

1.0 gm±0.1 gm. of test sample is spread lightly in a 2×2 section on the cure plate with a back-and-forth movement using a metal spatula. When the viscosity of the material increases, as noted by drag on the spatula, the spatula is removed. The point at which the material does not string but comes up in a film when the spatula is lifted is the end point. The time from the start is noted.

Using this test, it is found that the initial gel time is about 269 seconds at 150° C, for a 1 gm. batch.

At the end of 1 year, the batch prepared according to the above procedure had a gel-time value at 150° C. of 226 seconds. This indicates that the blend cures within a reasonable time for period up to a year.

EXAMPLE II

A. A test blend prepared in accordance with Example I except that 20 parts of the acid are used instead of 29, yields a 30 gm. gel time (in a 25×150 mm. test tube immersed in an oil bath) at 150° C. of 10 minutes for the initial blend and an 8.5 minute value after 3 months storage at 25° C. There is no substantial change in viscosity at 25° C. after 3 months (21,000 to 26,000 cps.).

B. Typically, gel times increase with decreasing test temperature. Thus, for the above blend, while initial gel time at 150° C. is 10 minutes; at 90° C. it is 120 minutes. Other values are as follows:

| Gel Temperature ° C. (30 gram mix | 100 | 110 | 120 | 130 | 140 |
|---|---|---|---|---|---|
| Gel Time (Minutes) | 50 | 31 | 20 | 16 | 12 |

C. The material prepared in Section A was heated at 90° C. until it gelled and was then post cured at the indicated temperature for 2 hours. The deflection temperature $^{*1}$ on material obtained is presented below:

| Cure Temperature ° C. | Deflection temperature ° C. |
|---|---|
| 130 | 141 |
| 140 | 140 |
| 150 | 149 |
| 160 | 137 |
| 170 | 135 |

*1. (Deflection temperature is the temperature required to deflect a 5×½×½ slab of test material 0.010 under a load of 264 p.s.i. and a temperature gradient increase of 2° C./min. This is a measure of thethermal relaxation behavior of the material with higher values indicating good thermal stability.

From the above, it can be seen that the optimum cure temperature is 150° C. Best deflection temperature was obtained at 150° C. postcure for 2 hours following the 90° C. gel period.

D. Material prepared in section A and gelled at 90° C. followed by 2 hours cure at 150° C. had the following physical characteristics when tested at 25° C. and 149° C.

|  | 25° C. | 149° C. |
|---|---|---|
| Tensile Strength (Ultimate) p.s.i. | 10,000 | 2,000 |
| Elongation at failure % | 3.4 | 12.0 |
| Flexural Strength (p.s.i.) | 15,800 | 2,780 |
| Volume Resistivity ohm-cm. | $1.03 \cdot 10^{16}$ | $2.30 \cdot 10^{11}$ |

EXAMPLE III

The procedure example I is followed using the following formulations:

|  | Parts |
|---|---|
| Methylene dianiline tetraepoxide | 100 |
| 4,6 bis [(2-aminophenyl) carbamyl]isophthalic acid | 30 |

The smooth blend was then used as an adhesive in tensile shear strength tests by preparing ½-inch overlap bonds in accordance with ASTM D-1002-64 for room temperature testing and MIL A-5090D for elevated temperature testing. Prior to testing, the material was cured for 20 minutes at 150° C., plus 1½ minutes heat-up time.

|  | p.s.i. |
|---|---|
| Tensile shear strength at 25° C. | 1,139 |
| Tensile shear strength at 149° C. | 1,380 |
| Tensile shear strength at 177° C. | 1,550 |
| Tensile shear strength at 200° C. | 1,170 |

EXAMPLE IV

Following the procedure of example I, smooth blends are obtained using the following latent hardeners in the amount indicated in place of the acid described in that example.

A. 4,6 bis [(4-methoxy-6-aminophenyl) carbamyl] isophthalic acid—30phr.

The system has an initial 30 gm. time of 12.5 minutes and retained its beneficial properties for over 1 month when stored at 25° C.

B. 4,6 bis [(4-benzimidazolyl phenyl) carbamyl] isophthalic acid—50 phr. 30 gm. gel time: 14 minutes.

EXAMPLE V 4,6 bis [(2-aminophenyl carbamyl)] isophthalic acid

A solution of 64.8 g. (0.6 mole) of 1,2-diaminobenze in 800 ml. dimethylformamide is prepared. To this stirring solution is added 67.4 g. (0.3 mole of pyromellitic dianhydride incrementally at a rate to keep the exotherm temperature below 35+ C. The solution is stirred for 1 hour at room temperature after the additions are completed. The solvent is removed at reduced pressure (ca. 0.5 mm.) until the remaining solid is absolutely dry. The solid is pulverized in a blender and washed twice with 700 ml. acetone until the product is a yellow solid. It is then repulverized in a blender and air dried. The product is a gold-colored solid, mp. 245° C. Dec. of acid number 200–220 mg./g. The yield is 115 g.

EXAMPLE VI 4,6-Bis (3,4-diaminoanisole carbamyl) isophthalic acid

The general procedure used in example V is followed using 82.8 g. (0.6 mole) of 3,4-diaminoanisole and 67.4 g. (0.3 mole) of pyromellitic dianhydride. The product is a pale yellow solid with a decomposition temperature of 275° C. and an acid number of 185–200 mg./g. The yield is 50 g.

EXAMPLE VII 4,6-Bis(3-aminophenyl carbamyl) isophthalic acid

The general procedure used in example V is followed using 64.8 g. (0.6 mole) of 1,3-diaminobenzene and 67.4 g. (0.3 mole) of pyromellitic dianhydride. The product is a yellow-colored solid, mp. 110° C. (dec.) of acid number 190–200 mg./g. The yield is 140 g.

EXAMPLE VIII 4,6-Bis(3-α-aminoxylylenyl carbamyl) isophthalic acid

The general procedure used in example V is followed using 81.7 (0.6 mole) of 1,3-xylylene diamine and 67.4 g. (0.3 mole) of pyromellitic dianhydride. The solid product decomposes from 130°–145° C. and has an acid number of 150–180 mg./g. The yield is 145 g.

EXAMPLE IX 4,6-Bis(4-aminomethylcyclohexyl carbamyl) isophthalic acid

The general procedure used in example V is followed using 85.2 g. (0.6 mole) of 1,4-cyclohexanebis (methyl amine) and 67.4 g. (0.3 mole) of pyromellitic dianhydride. The yellow solid melts at 190°–195° C. with decomposition. The infrared spectrum of the compound is analogous to that of other compounds in this series. The yield is 150 g.

EXAMPLE X 4,6-Bis(α-amino-p-methyl carbamyl) isophthalic acid

The general procedure used in example V is followed using 102 g. (0.6 mole) of p-menthane diamine and 67.4 g. (0.3 mole) of pyromellitic dianhydride. The product is a solid, mp. 250° C. (dec.) of acid number 173 mg./g. The yield is 170 g.

EXAMPLE XI

A solution of 100 g. (0.48 mole) of 2-(p-aminophenyl) benzimidazole in 2,000 ml. of dimethylformamide is prepared. To this stirring solution is added 50 g. (0.22 mole) of pyromellitic dianhydride incrementally at a rate to keep the exotherm temperature below 35° C. The solution is stirred at 30° C. until a precipitate forms. The product is filtered and washed twice with 50 ml. of dimethylformamide. The light yellow, infusible solid has an acid number of 160 mg./g. The yield is 116 g.

What is claimed is:

1. A latent curing resin composition capable of being cured at elevated temperatures comprising a 1, 2 epoxy resin and a compound having the formula

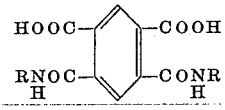

wherein R is a substituted phenyl radical of the formula

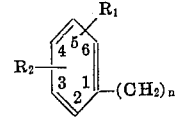

or a substituted cyclohexyl radical of the formula

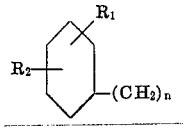

$n$ is 0 or 1 and $R_1$ and $R_2$ are hydrogen, alkyl, amino, alkylamino, alkoxy or a heterocyclic system containing a heteronitrogen atom carrying an active hydrogen provided that at least one of $R_1$ and $R_2$ is amino bearing, in an amount of from 10 to 45 parts of said compound per 100 parts of resin.

2. The composition of claim 1 wherein R is the substituted phenyl radical and $n$ is O.

3. The composition of claim 2 wherein $R_1$ is 2-amino and $R_2$ is hydrogen.

* * * * *